May 11, 1943.　　　　　W. PARK　　　　　2,318,961

PLANETARIUM

Filed Sept. 20, 1941　　　　2 Sheets-Sheet 1

Inventor.
William Park.

May 11, 1943.    W. PARK    2,318,961
PLANETARIUM
Filed Sept. 20, 1941    2 Sheets-Sheet 2

Inventor.
William Park.

Patented May 11, 1943

2,318,961

UNITED STATES PATENT OFFICE 2,318,961

PLANETARIUM

William Park, Toronto, Ontario, Canada

Application September 20, 1941, Serial No. 411,638

5 Claims. (Cl. 35—45)

This invention relates to improvements in planetariums and the principal objects are to provide a device which will be very useful for educational purposes to demonstrate in a comprehensive manner the relative positions day and night throughout the different seasons of the earth, sun and moon and the other heavenly bodies, including the planets, the major stars and the constellations.

The principal feature of the invention resides in the novel provision of globes mounted on a rotative mechanism and representing the sun, moon and earth, and a dome-like representation of the heavens arranged in concentric relation to the rotatable earth globe, such dome being preferably in hemispherical form and having a non-reflective interior, said dome also having illuminated points visible from the interior arranged to represent the planets, stars and constellations in their relative positions in the heavens, the earth globe being provided with a reflective surface so that the light areas in the heavenly dome representative of the planets and heavenly bodies may be viewed as reflections on the darkest side of the earth globe facing the interior of the dome.

A further and important feature of the invention resides in the combination with the heavenly dome and concentrically disposed earth globe of a small hemispherical reflector adapted to be variably placed on the earth globe surface at selected spots so that upon the rotation of the earth globe to bring the hemispherical reflector into the darkened zone within the heavenly dome, the selected star or other heavenly display under observation will be viewed as a reflection which travels in an arc over the hemispherical reflective surface truly representative of the apparent course of travel from dusk to dawn of a star or constellation in relation to an observer on the earth.

A further and important feature of the invention resides in the novel relative co-operation between the heavenly dome and the sun and earth whereby the sun globe may be made to replace the earth as the central element of the dome, while the earth on a smaller scale may be caused to move in its orbit about the sun within the dome to clearly depict the seasonal relationships between the sun, earth and the various seasons as zodiacally depicted on the heavenly done by the illuminated areas.

In the accompanying drawings

Figure 1:
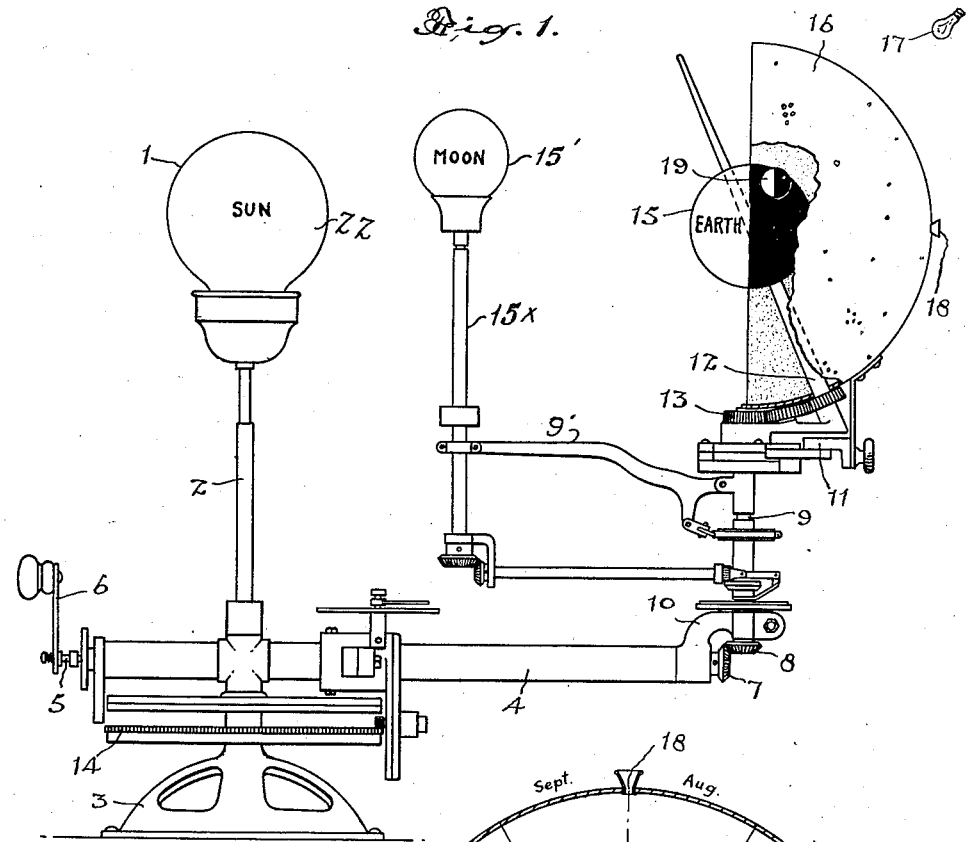
Figure 1 is an elevational view of a planetarium device constructed in accordance with this invention illustrating a mechanism rotatable about the axis of a globe representing the sun and carrying a rotatable moon globe and a rotatable earth globe with a dome mounted concentrically to the earth globe and representing the heavens.

Planetarium or tellurian devices for purposes of illustrating the relative position of the sun, earth and moon at different periods of the year and which are operated by means of co-ordinated gear mechanisms have long been in use, and the present invention contemplates the use of any such devices in association with a dome-like canopy arranged in concentric relation to the earth or sun globe, such canopy having arranged diagrammatically upon its inner surface the relative representation of the planets, stars, constellations and other heavenly bodies depicted by areas of light which will be reflected upon the reflective surface of the concentric globe.

In the form of the device herein shown an illuminated globe 1, representing the sun, is mounted upon a standard 2 supported by a base 3. Rotatably mounted on the standard 2 above the base is a horizontal tubular support 4 through which a shaft 5 extends which is operated by a crank 6 at one end thereof. The crank shaft 5 has mounted on its opposite end a bevel pinion 7 which meshes with a bevel pinion 8 secured to a vertical shaft 9 mounted in a bracket 10 carried by the horizontal support 4.

A bracket 11 is arranged at the upper end of the shaft 9 and has rotatably mounted therein in an angular position a shaft 12 which is inclined at the angle of inclination of the axis of the earth. This shaft is connected by a train of gears 13 so that as the crank shaft 5 is turned the shaft 12 is rotated. The shaft 5 is also geared to a fixed gear ring 14 mounted on the standard 2 to swing the horizontal support 4 so as to rotate the vertical shaft 9 and the angularly mounted shaft 12 around the sun globe.

An earth globe 15 is mounted on the angularly arranged shaft 12. The relative speeds of rotation are such that the earth is rotated on its axis 365 times while the horizontal support 4 is completing one revolution about the sun globe standard.

A moon globe 15' is mounted on a spindle 15× carried by an arm 9' rotatably mounted on the vertical shaft 9 and such arm is rotated about the shaft 9 by suitable gearing to cause the moon globe to rotate once about the earth globe with every revolution of said earth globe.

The gear mechanism and the structure of the relative sun, earth and moon supports are known.

In the application of the present invention herein illustrated a hemispherical dome 16 is mounted on the bracket 11 carrying the earth globe supporting shaft in such a position that it is co-axial with the earth globe. This dome may be any desirable size and upon its interior surface, which is desirably non-reflective, is depicted an arrangement of the celestial bodies, planets, stars and constellations. These celestial bodies are preferably represented by small points of light which may economically by formed by small holes pierced in the dome through which an exterior light may shine, this light being represented by the light source 17. The celestial bodies may of course be represented by individual lights where the dome may be large enough for such arrangement.

The earth globe is preferably formed with a reflective surface and it will have suitable markings thereon representing the continents and seas, and the light from the sun globe 1 illuminates the outer half extending beyond the hemispherical dome 16, the outer illuminated half of the earth thus representing the portion of the earth in daylight. The inner half facing the inner part of the dome represents the portion of the earth where it is night and the illuminated points or light areas appearing on the interior of the dome will be reflected upon the inner reflective surface of the earth globe to be observed by looking in around the perimeter of the half spherical dome.

The dome may, if desirable, be provided with a peep-hole 18 so that an observer may look through the dome and see the reflected points of light which represent the planets, stars or constellations and he may locate where the constellations or other heavenly bodies are to be seen from the earth's surface at any particular time or season as indicated by the reflection on the earth globe surface.

It will also be understood that the reflection of the points of light representing celestial bodies in the dome may be seen from looking in around the night-side portion of the earth globe as shadowed by the dome. This viewing of the reflection of the points of light in the superposed dome may be rendered very effective by providing a dome of much larger proportion than that shown which can be suitably supported concentric with the earth globe. In fact the dome may be made so large as to form the canopy of a room in which the earth globe is arranged and the machine may be shifted about if desired to centralize it with the canopy, and an observer might pass around the darkened side of the earth globe and observe the reflection of light from the dome, the rest of the equipment being of course designed to suit such an arrangement. The reflection of the illuminated representation of the celestial bodies on the earth's surface indicates the point on the earth's surface from which the particular celestial body may be seen at a particular period.

Figure 4:
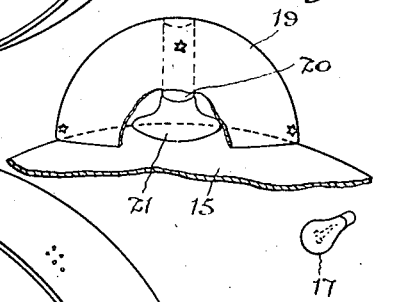
Figure 4 is an enlarged broken perspective detail of the movable reflective hemisphere shown applied to a portion of the surface of the earth globe.
Figure 3:
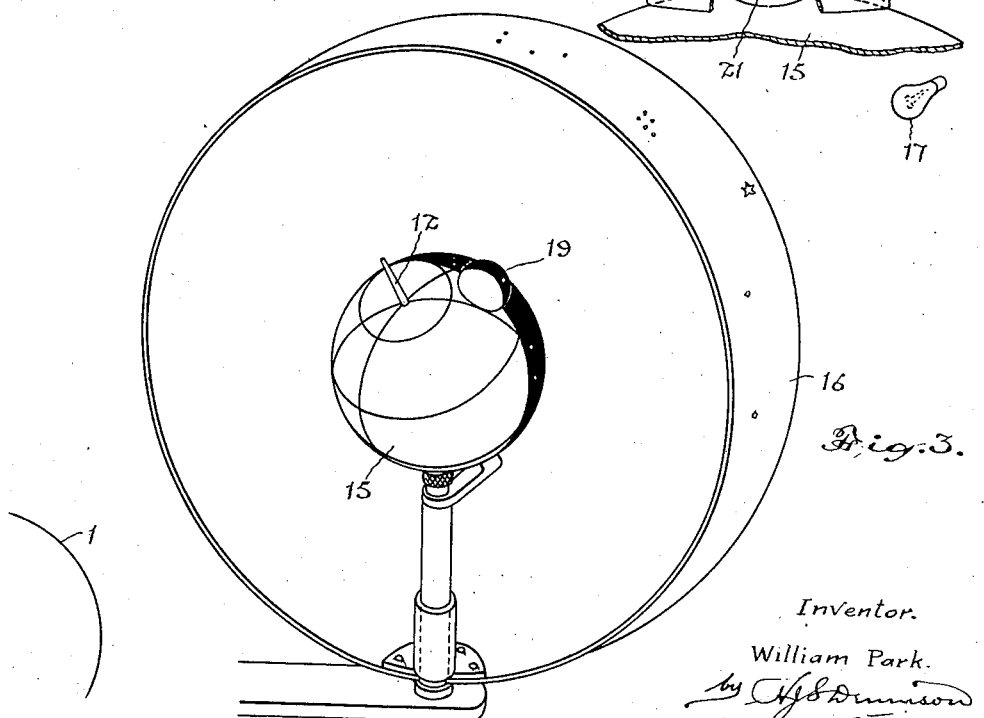
Figure 3 is a perspective view similar to Figure 2 showing the application to the surface of the earth globe of a reflective hemisphere for illustrating the apparent path of movement of the heavenly bodies at that particular point of location on the earth's surface.

A further feature of the present invention is the application of a small hemispherical convexed reflector 19 which is illustrated as applied to the earth globe in Figures 1 and 3 and its detail is shown in Figure 4. This small reflective hemisphere, as shown in Figure 4, is provided with a central stem 20 to which is attached a suction cup 21 to enable it to be attached at any point on the earth's surface.

When this semi-circular reflector is placed in a certain position, let us say in the locality of Toronto or Washington, it will, at a certain time of the day in accordance with the rotation of the earth upon its axis, be fully illuminated by the sun, but on being swung into the darkened half of the earth away from the sun it will pick up reflections of the points of light in the dome 16, and as the earth turns on its axis the path of the reflected points of light over the hemispherical reflector represents the path of the particular planets or stars as they appear to a person located in the spot over which the reflecting hemisphere is placed. That is to say, as the reflection of a certain star is picked up by the reflective hemisphere attached to the earth globe, as the earth globe is rotated on its axis, it represents the position of that star at dusk, and as time continues the star will be seen to change its location and either sink down and be lost on the horizon, or rise from the horizon. The complete path of any particular star may thus be observed as appearing at that particular spot from dusk until dawn.

It will be readily appreciated that students of geography and astronomy may, by the use of this apparatus, obtain a very clear visual knowledge of the locality and movement of the stars in relation to the earth, sun and moon by looking into the dome and seeing the points of light representing the stars, which of course may be made in varying sizes or colours, whether by means of perforations permitting an external light to shine through or by means of individual lamps or possible a similar effect may be obtained by using small reflective areas on a dead black or non-reflective background which will reflect the light in the room where the instrument is located.

A further knowledge of where the various celestial bodies may be seen upon the earth and the time of their appearance may be obtained by observing the reflection of the light spots representing such stars, planets, etc., as reflected on the surface of the earth globe.

Then a different view and impression of the heavenly bodies may be obtained by observing the path of movement of the reflection of any particular star upon the small hemispherical reflector placed in any particular spot upon the surface of the earth globe to show the path of movement of the particular star under observation as it appears in the particular locality on the earth's surface as represented by the placing of the semi-hemispherical reflector.

Figures 5, 6:
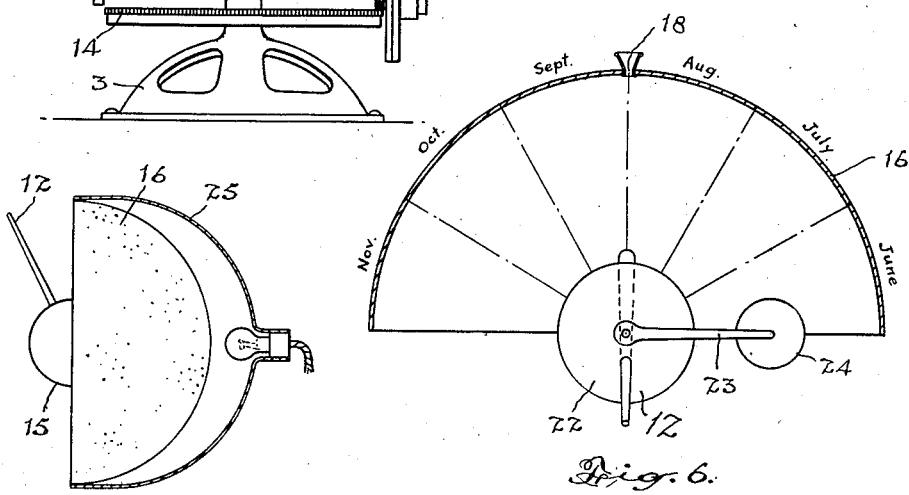
Figure 5 is a reduced part sectional view showing the earth globe and its partly encircling hemispherical dome with an enclosing light reflector on the outer side thereof.
Figure 6 is a plan sectional view of the dome representative of the heavens with the sun globe arranged coaxially thereof and an earth globe arranged relative to the sun.
Figure 2:
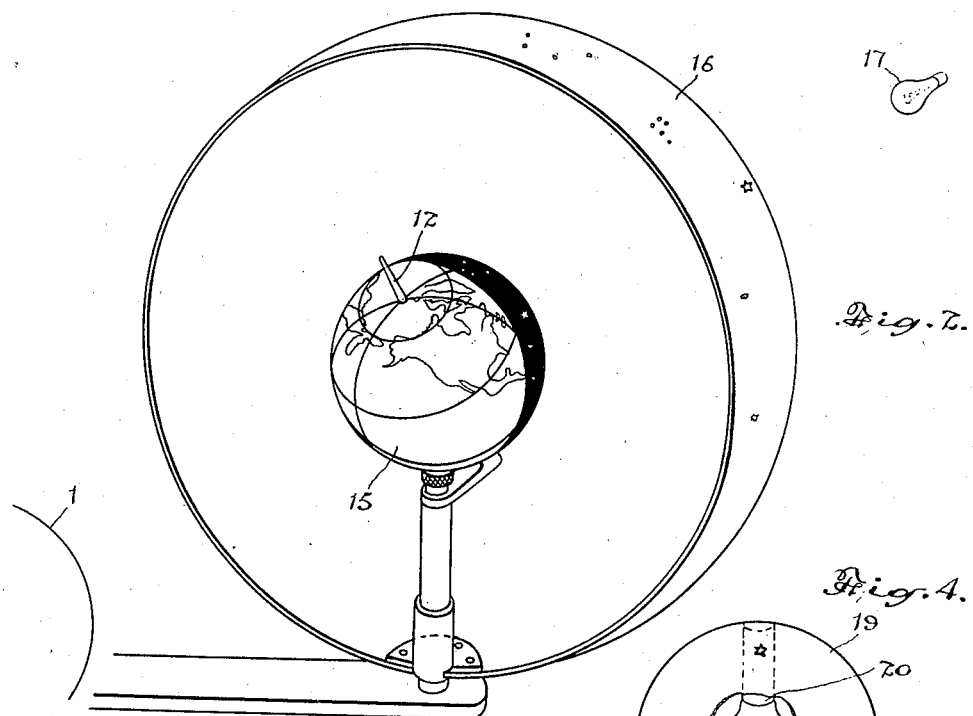
Figure 2 is an enlarged perspective detail showing the earth globe concentrically mounted in relation to the surrounding hemispherical dome representative of the heavens with the representation of the sun in the foreground.

A still further phase of novelty and utility of the present invention may be found by removing the earth globe from its axis and placing on the axis the globe 22, to represent the sun, and upon which is mounted by means of a laterally projecting arm 23, globe 24 to represent the earth, as shown in Figure 6. By swinging the earth globe in an arc of a circle about the axis of the sun globe 22 within the dome 16 representing the heavens the reflection of the constellations of the zodiac will appear on the reflective surface of the small earth globe to show their relationship at the different periods of the year and the earth revolves about the sun as lines or other markings may be arranged on the interior of the dome separating the various months, such as illustrated in Figure 6, from the month of June to November, and the reflections as seen upon the earth globe surface indicate the constellations that may be seen at the different seasons.

It has been stated that the dome representing the heavenly canopy may be enlarged greatly from that shown and it has also been stated that such canopy may form the ceiling of a room and it must be understood that it might even be found possible to make an enlarged sphere with the earth globe mounted centrally thereof with suitable platform provisions for the observing students who might thus be able to view from different vantage points the entire heavenly dome, though of course for more practical purposes where the device would be used in a classroom the comparatively small hemispherical dome will be very efficient.

The drawings illustrate diagrammatically the preferred arrangement of light sources outside of the dome to shine through perforations therein. These may be arranged at various points, or, as shown in Figure 5 an outer canopy 25 may be arranged to encircle the dome and the interior of this canopy between its inner wall, which would be of a reflective nature, and the outer wall of the dome 16 representing the heavens would be filled with light reflected back and forth from the outer canopy, which would thus illuminate perforations representing stars anywhere in the dome so that the reflection of such stars may be seen on the reflective surface of the earth globe which indicates the position on the earth from which any selected star may be seen at a particular time.

The device as herein described is extremely simple but it performs an entirely novel and desirable visual presentation of the arrangement of the heavenly bodies and their relationship to the earth, sun and moon, so that teaching subjects relative to the various bodies of the universe may be rendered very simple and effective.

What I claim as my invention is:

1. In a planetarium the combination with the representation of the earth of a canopy representing the heavens arranged concentric to the earth and having light areas representing heavenly bodies to be reflected from the surface of the earth globe.

2. A planetarium comprising, the representation of the sun, means adapted to rotate about the representation of the sun, an earth globe rotatably mounted on said rotatable means and depicting the relative position of the earth and sun, said earth globe having a reflective surface, and a hemispherical dome mounted on said means rotatable about the sun coaxially with the earth globe, said dome having areas illuminated to represent the planets, stars and constellations to be reflected on the earth surface.

3. A device as claimed in claim 2 in which the dome is pierced to permit the passage of light therethrough in representation of the planets, stars and constellations, and means for illuminating the exterior of the dome are provided to project light through the perforations to be reflected on the reflective surface of the earth globe.

4. In a planetarium, a sun globe, means rotatable about the sun globe, an earth globe rotatably mounted on said rotatable means and operable to rotate on its axis in relation to its movement around the sun globe, a dome arranged concentric to the earth globe having a non-reflective interior and having areas adapted to be lighted to represent celestial bodies, and a small reflective hemisphere adapted to be selectively attached to points on the earth's surface to reflect the light areas appearing in the non-reflective dome illustrating the apparent path of movement of the heavenly bodies relative to the position of the observer on the surface of the earth as it rotates upon its axis.

5. A planetarium having a dome representing the heavens and having depicted on its inner surface a diagrammatic arrangement of the planets, stars and constellations, an axis co-axial with said dome, a sun globe mounted on said axis, and an earth globe supported to rotate about said sun globe within said dome, said earth globe having a reflective surface to illustrate the relative position of the constellations of the zodiac in accordance with the seasonal movement of the earth about the sun.

WILLIAM PARK.